United States Patent
Yu

(10) Patent No.: US 6,671,521 B1
(45) Date of Patent: Dec. 30, 2003

(54) REMOTE (OR WIRE) CONTROL AUXILIARY PUSH BUTTON DIALING SYSTEM

(75) Inventor: Wen-Hsiung Yu, Taichung Hsien (TW)

(73) Assignee: Complex Instrument Technology Corp. (TW)

( * ) Notice: Subject to any disclaimer, the term of this patent is extended or adjusted under 35 U.S.C. 154(b) by 593 days.

(21) Appl. No.: 09/711,058

(22) Filed: Nov. 10, 2000

(51) Int. Cl.⁷ ................................................ H04M 1/00
(52) U.S. Cl. .................. 455/556.1; 455/564; 455/566; 455/569.2; D14/140; D14/137; D14/244
(58) Field of Search .......................... 455/550, 556.1, 455/556.2, 565, 564, 566, 569.2; 379/456, 454, 447, 446; 345/168, 169, 156, 173; D14/217, 244, 240, 246, 247, 137, 257, 138, 140, 142, 155, 188

(56) References Cited

U.S. PATENT DOCUMENTS

| | | | |
|---|---|---|---|
| 4,852,146 A | * | 7/1989 | Hathcock et al. ........... 455/564 |
| 5,140,632 A | * | 8/1992 | Anten ........................ 379/447 |
| 5,151,946 A | * | 9/1992 | Martensson ............... 455/575.4 |
| 5,528,681 A | * | 6/1996 | Iwai et al. .............. 379/355.05 |
| 5,633,912 A | * | 5/1997 | Tsoi ........................... 455/566 |
| 5,818,701 A | * | 10/1998 | Shindo ........................ 361/814 |
| 6,208,876 B1 | * | 3/2001 | Raussi et al. ............... 455/557 |

* cited by examiner

Primary Examiner—Dwayne Bost
Assistant Examiner—Kamran Afsar
(74) Attorney, Agent, or Firm—Connolly Bove Lodge & Hutz, LLP

(57) ABSTRACT

A remote (or wire) control auxiliary push button dialing system includes a push button device, and a mobile telephone auxiliary dialing device. The mobile telephone auxiliary dialing device together with a mobile telephone is mounted in a receptacle. The push button device includes a keyboard push button and a key signal processor. The mobile telephone auxiliary dialing device includes a signal receiving controller, a pair of X/Y axis sliding arms, and a press module. In such a manner, the signal receiving controller receives push button coding signals transmitted by the push button device to serially control the pair of X/Y axis sliding arms to move longitudinally and transversely to fixed coordinate positions so as to further perform auxiliary push button dialing action of the mobile telephone by the press module.

9 Claims, 6 Drawing Sheets

REMOTE (OR WIRE) CONTROL AUXILIARY PUSH BUTTON DIALING SYSTEM

BACKGROUND OF THE INVENTION

1. Field of the Invention

The present invention relates to a remote (or wire) control auxiliary push button dialing system, and more particularly to a remote (or wire) control auxiliary push button dialing system for a mobile telephone.

2. Description of the Related Art

A conventional mobile telephone having a hand-free receiver in accordance with the prior art is mounted in an automobile so that the driver in the automobile can perform the dialogue function during driving the steering wheel without having to hold the mobile telephone. However, the driver still has to press the press buttons on the mobile telephone for performing the dialing function whereby the driver's hand has to leave the steering wheel so as to press the press buttons while the driver has to turn around his head to see the numbers on the compact press buttons for dialing the correct telephone numbers so that the drive's view of sight will deviate the direction of travel of the automobile, thereby easily causing danger to the driver during driving. In addition, the electromagnetic radiation rays close to the human body will cause adverse effect on the user's health.

SUMMARY OF THE INVENTION

In accordance with one aspect of the present invention, there is provided a remote (or wire) control auxiliary push button dialing system comprising a push button device, and a mobile telephone auxiliary dialing device, the mobile telephone auxiliary dialing device and a mobile telephone being mounted in a receptacle;

the push button device including a keyboard push button and a key signal processor;

the mobile telephone auxiliary dialing device including a signal receiving controller, a pair of X/Y axis sliding arms, and a press module;

wherein, the signal receiving controller receives push button coding signals transmitted by the push button device to serially control the pair of X/Y axis sliding arms to move longitudinally and transversely to fixed coordinate positions to further perform auxiliary push button dialing action of the mobile telephone by the press module.

Further benefits and advantages of the present invention will become apparent after a careful reading of the detailed description with appropriate reference to the accompanying drawings.

DETAILED DESCRIPTION OF THE INVENTION

Figure 1:
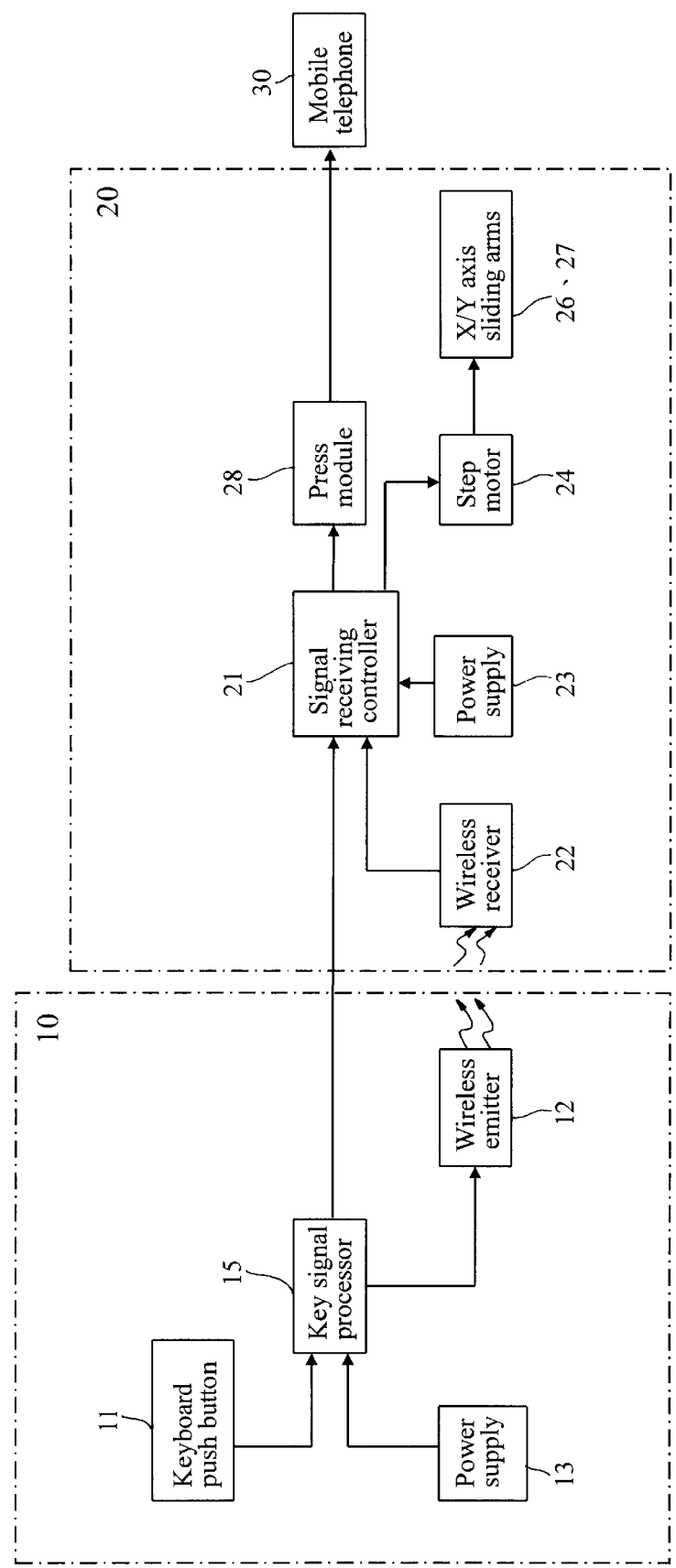
FIG. 1 is a flow chart of a remote (or wire) control auxiliary push button dialing system in accordance with the present invention.
Figure 2:
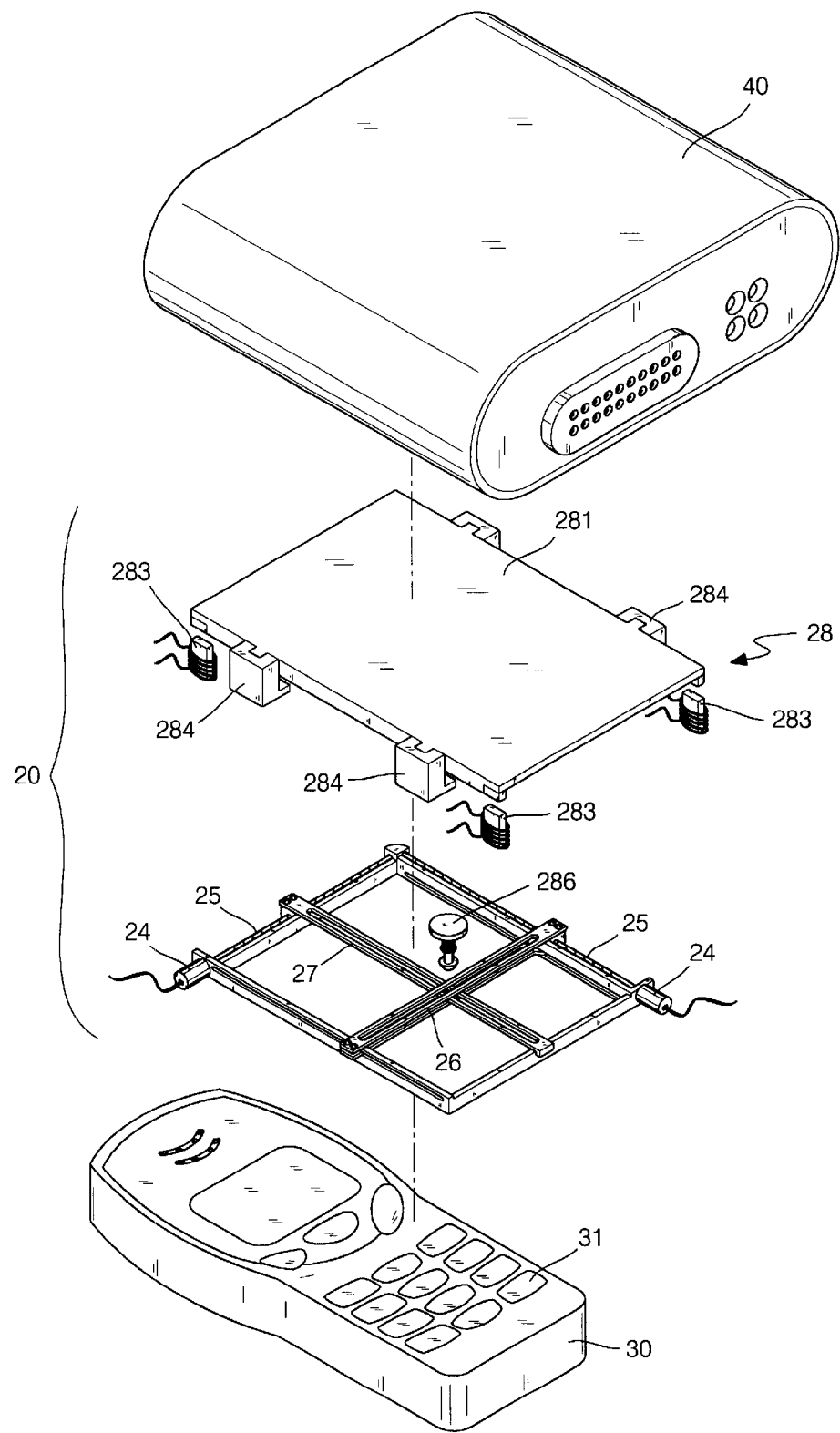
FIG. 2 is an exploded view of a mobile telephone auxiliary dialing device of the remote (or wire) control auxiliary push button dialing system in accordance with a first embodiment of the present invention.

Referring to the drawings and initially to FIGS. 1–6, a remote (or wire) control auxiliary push button dialing system for a mobile telephone 30 in accordance with a first embodiment of the present invention comprises a push button device 10, and a mobile telephone auxiliary dialing device 20. The mobile telephone auxiliary dialing device 20 together with the mobile telephone 30 is mounted in a receptacle 40.

The push button device 10 includes a keyboard push button 11, and a key signal processor 15. The keyboard push button 11 corresponds to the matrix array of the push button 31 of the mobile telephone 30.

The key signal processor 15 of the push button device 10 codes each of the push button dialing signals into key code signals which are transmitted into the remote mobile telephone auxiliary dialing device 20 by wires or by a wireless emitter 12 so that the mobile telephone auxiliary dialing device 20 can perform an auxiliary push button dialing action of the mobile telephone 30 by the press module 28. The power supply 13 is used for supplying a direct current voltage required for processing the signals.

The mobile telephone auxiliary dialing device 20 includes a signal receiving controller 21, a pair of X/Y axis sliding arms 26 and 27, and a press module 28.

The signal receiving controller 21 serially codes the push button coding signals received by wires or by a wireless receiver 22 into a plurality of press position coordinate data $(P_x, P_y)$ respectively, and each of the press position coordinate data $(P_x, P_y)$ respectively corresponds to the XY axis coordinate position of each of the push buttons 31 of the mobile telephone 30.

Then, according to the received push button coding signals and the respective press position coordinate data $(P_x, P_y)$, the signal receiving controller 21 serially control two sets of step motors 24 which drive the respective threaded rods 25 so as to respectively move the pair of X/Y axis sliding arms 26 and 27 longitudinally and transversely. A vertical Z-axis position of an intersecting coordinate of the pair of X/Y axis sliding arms 26 and 27 corresponds to the coordinate position of the frame platform of the X/Y axis.

Figure 5:
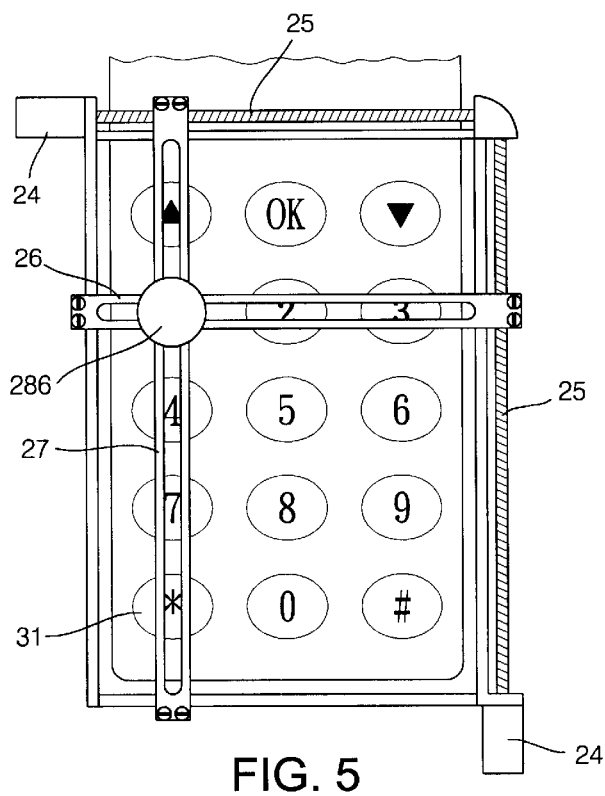
FIG. 5 is a top plan assembly view of the mobile telephone auxiliary dialing device of the remote (or wire) control auxiliary push button dialing system as shown in FIG. 2.
Figure 6:
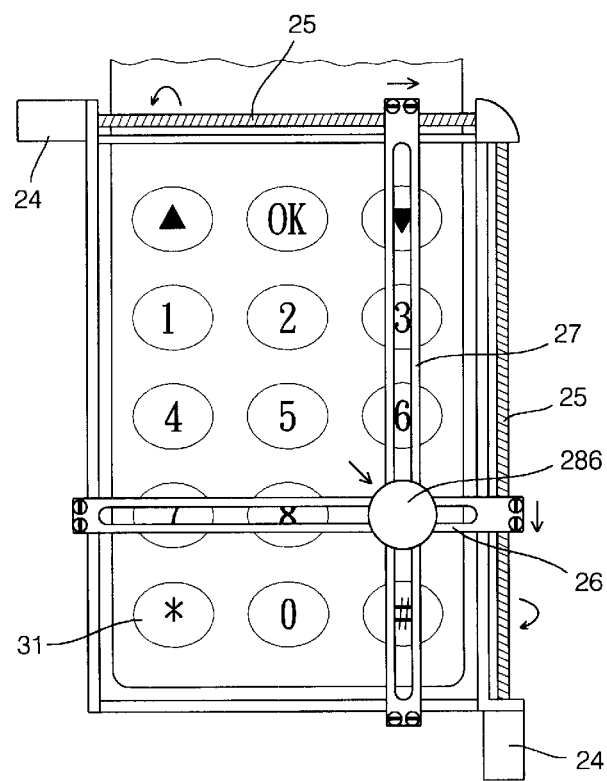
FIG. 6 is an operational view of the mobile telephone auxiliary dialing device of the remote (or wire) control auxiliary push button dialing system as shown in FIG. 5.

Accordingly, according to the received push button coding signals and the respective press position coordinate data ($P_x$, $P_y$), the pair of X/Y axis sliding arms 26 and 27 can be moved to a fixed coordinate position as shown in FIGS. 5 and 6. When the intersecting coordinate of the pair of X/Y axis sliding arms 26 and 27 is moved to mate with the position of the push button 31 of the mobile telephone 30, the signal receiving controller 21 will actuate the press module 28 to further perform an auxiliary dialing action of the push button 31 of the mobile telephone 30 by the press module 28. The power supply 23 is used for supplying a direct current voltage required by the push button dialing system.

The press module 28 includes a press plate 281, and a press member 286. The press member 286 fitted with a spring 287 is integrally slidably mounted on the Z-axis position of the intersecting coordinate of the pair of X/Y axis sliding arms 26 and 27. The press member 286 has a bottom provided with an arcuate press head 288 corresponding to one of the push buttons 31 of the mobile telephone 30 to move downward to press the push button 31 as shown in FIG. 4 so as to perform the auxiliary dialing action of the push button 31 of the mobile telephone 30.

Figure 3:
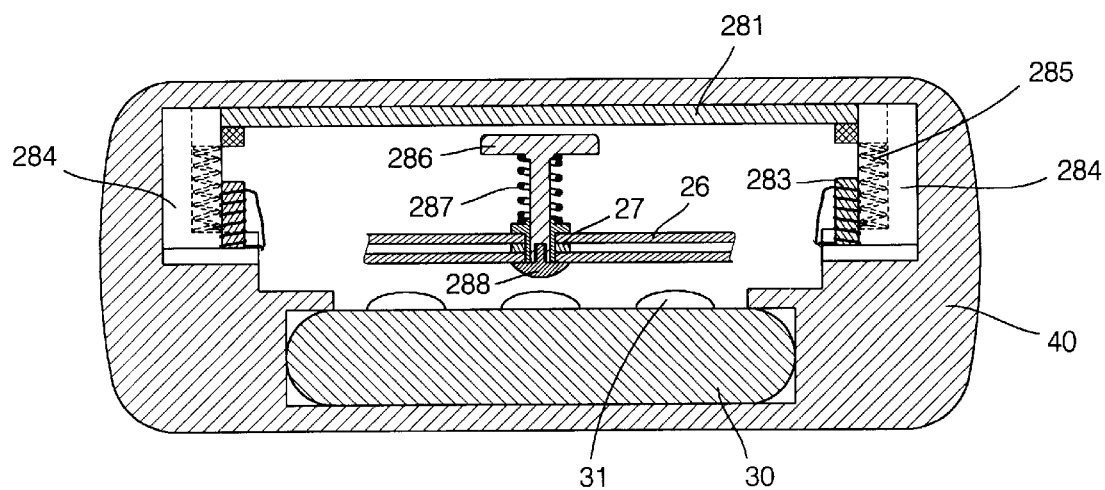
FIG. 3 is a side plan cross-sectional assembly view of the mobile telephone auxiliary dialing device of the remote (or wire) control auxiliary push button dialing system as shown in FIG. 2.
Figure 4:
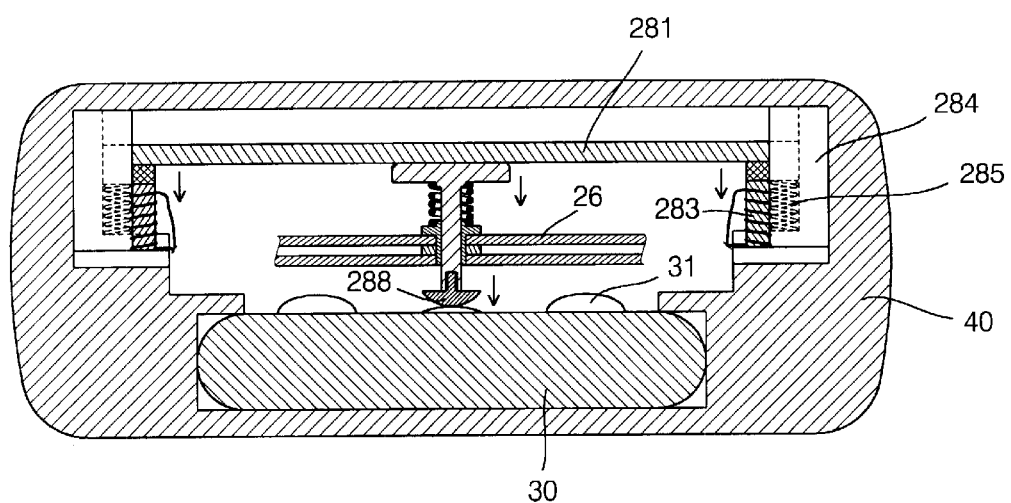
FIG. 4 is an operational view of the mobile telephone auxiliary dialing device of the remote (or wire) control auxiliary push button dialing system as shown in FIG. 3.

The press module 28 includes a plurality of positioning bases 284 secured in the receptacle 40 and rested on the press plate 281 for slidably supporting the press plate 281, a plurality of restoring springs 285 each mounted between the press plate 281 and each of the positioning bases 284 so that the press plate 281 is pressed upward to separate from the press member 286 as shown in FIG. 3, and a plurality of electromagnets 283 each secured on the positioning base 284 for attracting the press plate 281 made of metal so that the press plate 281 is vertically moved downward on the positioning bases 284 along the vertical Z-axis so as to press the press member 286 as shown in FIG. 4, thereby performing the auxiliary dialing action of the push button 31 of the mobile telephone 30.

The press module 28 together with the pair of X/Y axis sliding arms 26 and 27 is secured in the receptacle 40 while the mobile telephone 30 is directly inserted into the receptacle 40 with the push buttons 31 of the mobile telephone 30 facing the press module 28, thereby performing the remote (or wire) control auxiliary dialing action of the push button 31 of the mobile telephone 30.

Figure 7:
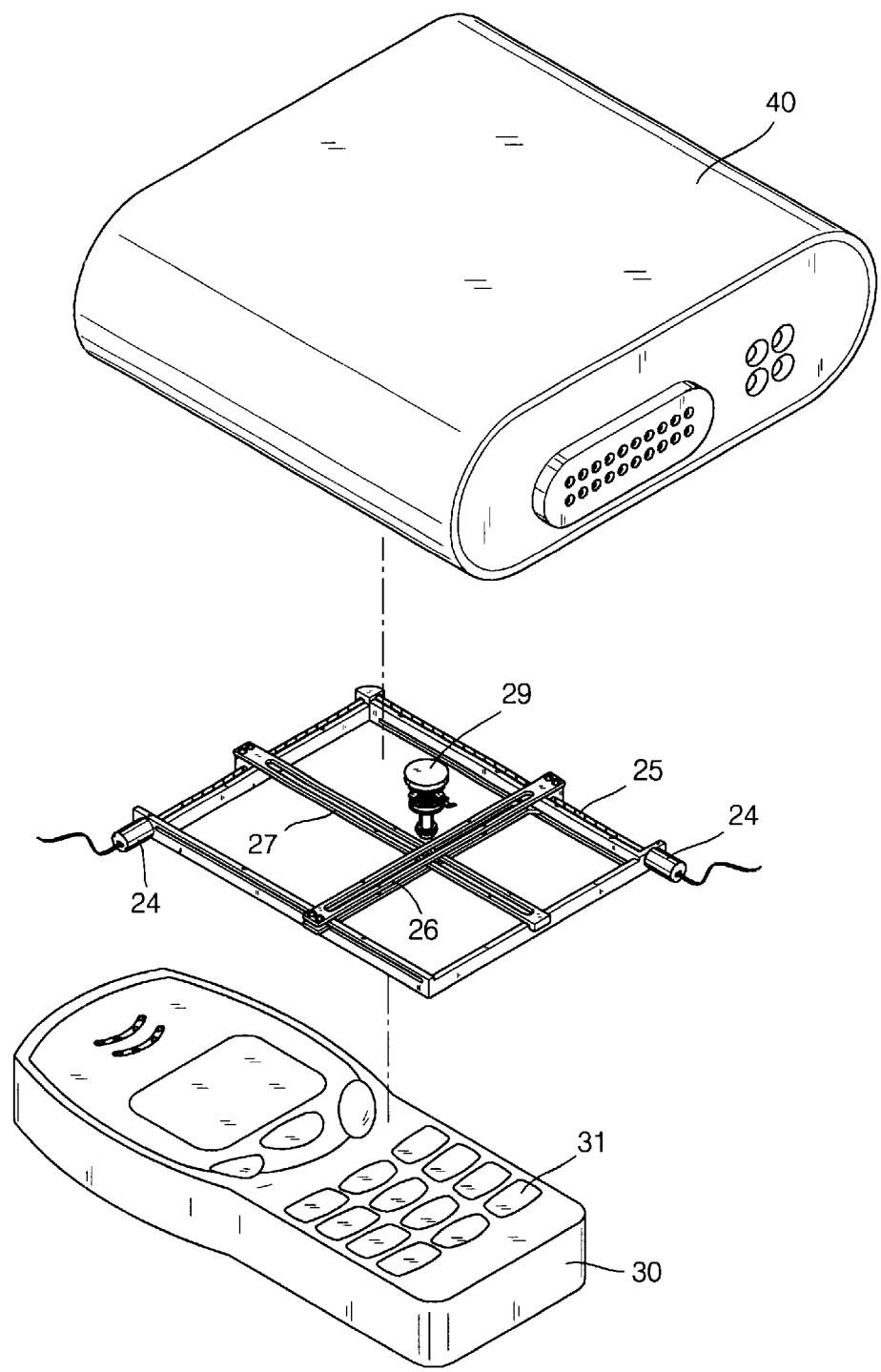
FIG. 7 is an exploded view of a mobile telephone auxiliary dialing device of the remote (or wire) control auxiliary push button dialing system in accordance with a second embodiment of the present invention.
Figure 8:
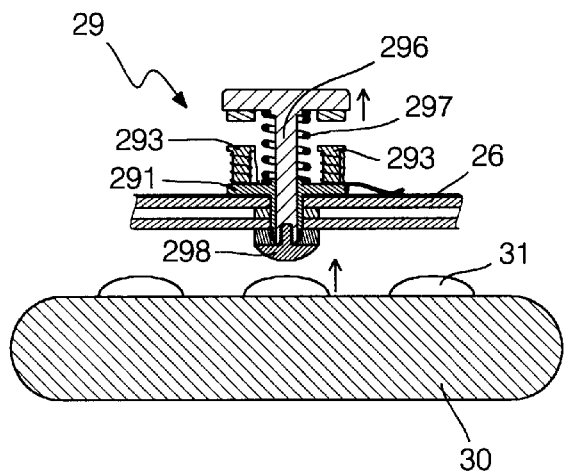
FIG. 8 is a side plan cross-sectional assembly view of the mobile telephone auxiliary dialing device of the remote (or wire) control auxiliary push button dialing system as shown in FIG. 7.
Figure 9:
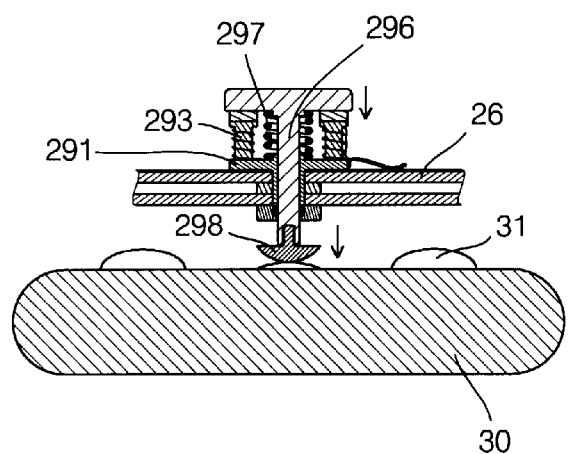
FIG. 9 is an operational view of the mobile telephone auxiliary dialing device of the remote (or wire) control auxiliary push button dialing system as shown in FIG. 8.

Referring to FIGS. 7–9, in accordance with a second embodiment of the present invention, the press module 29 includes a press rod 296 in turn extending through a spring 297 and a support rack 291 and integrally mounted on the Z-axis position of the intersecting coordinate of the pair of X/Y axis sliding arms 26 and 27. The press module 29 includes a plurality of electromagnets 293 mounted on the support rack 291 for attracting the press rod 296 to move downward so as to press one of the push buttons 31 of the mobile telephone 30 by the arcuate press head 298 of the press rod 296 as shown in FIG. 9, thereby performing the remote (or wire) control auxiliary dialing action of the push button 31 of the mobile telephone 30.

In operation, the user can use the push button device 10 so as to transmit the dialing signals into the remote mobile telephone auxiliary dialing device 20 in a wire or wireless manner. Then, the signal receiving controller 21 actuates and controls the pair of X/Y axis sliding arms 26 and 27 to move longitudinally and transversely to the fixed coordinate position while the press module 28 (or 29) located at the intersecting position of the pair of X/Y axis sliding arms 26 and 27 is vertical moved downward along the Z-axis to press the push button 31 of the mobile telephone 30, thereby performing the remote (or wire) control auxiliary dialing action of the push button 31 of the mobile telephone 30.

In such a manner, when the user is driving, he/she needs not to directly press the compact push buttons 31 of the mobile telephone 30 so that the user can entirely pay attention to driving the car without having to press the small sized push buttons 31 of the mobile telephone 30 for dialing the telephone numbers during driving. In addition, the present invention employs a easily operated remote (or wire) control auxiliary push button dialing system for performing the dialing function to co-operate a hand-free receiver so that the user can safely employ the mobile telephone, thereby preventing incurring an accident, and thereby preventing the electromagnetic radiation rays from directly touching the human body.

It should be clear to those skilled in the art that further embodiments may be made without departing from the scope of the present invention.

What is claimed is:

1. An auxiliary push button dialing system comprising a push button device, and a mobile telephone auxiliary dialing device, said mobile telephone auxiliary dialing device and a mobile telephone being mounted in a receptacle;

said push button device including a keyboard push button and a key signal processor;

said mobile telephone auxiliary dialing device including a signal receiving controller, a pair of X/Y axis sliding arms, and a press module;

wherein, said signal receiving controller receives push button coding signals transmitted by said push button device to serially control said pair of X/Y axis sliding arms to move longitudinally and transversely to fixed coordinate positions to further perform auxiliary push button dialing action of said mobile telephone by said press module.

2. The auxiliary push button dialing system in accordance with claim 1, wherein said key signal processor of said push button device codes push button dialing signals into key code signals which are transmitted into said mobile telephone auxiliary dialing device.

3. The auxiliary push button dialing system in accordance with claim 1, wherein said signal receiving controller serially codes said push button coding signals into press position coordinate data respectively, and said press position coordinate data respectively correspond to push button coordinate positions of said mobile telephone.

4. The auxiliary push button dialing system in accordance with claim 1, wherein said signal receiving controller serially control two sets of step motors and threaded rods so as to respectively move said pair of X/Y axis sliding arms longitudinally and transversely.

5. The auxiliary push button dialing system in accordance with claim 1, wherein said press module includes a press plate, and a press member, and said press member is fitted with a spring, and is integrally mounted on a Z-axis position of an intersecting coordinate of said pair of X/Y axis sliding arms.

6. The auxiliary push button dialing system in accordance with claim 5, wherein said press member has a bottom provided with an arcuate press head corresponding to one of a plurality of push buttons of said mobile telephone for pressing said one push button.

7. The auxiliary push button dialing system in accordance with claim 5, wherein said press module includes a plurality of positioning bases secured in said receptacle and rested on said press plate for slidably supporting said press plate, a plurality of restoring springs each mounted between said press plate and each of said positioning bases so that said press plate is slidably mounted on said positioning bases, and a plurality of electromagnets each secured on said positioning base for attracting said press plate made of metal so that said press plate is vertically moved on said positioning bases so as to press said press member.

8. The auxiliary push button dialing system in accordance with claim 1, wherein said press module includes a press rod in turn extending through a spring and a support rack and integrally mounted on a Z-axis position of an intersecting coordinate of said pair of X/Y axis sliding arms.

9. The auxiliary push button dialing system in accordance with claim 8, wherein said press module includes a plurality of electromagnets mounted on said support rack for attracting said press rod to move downward so as to press one of a plurality of push buttons of said mobile telephone.

* * * * *